United States Patent [19]

Hiramatsu

[11] Patent Number: 5,180,307
[45] Date of Patent: Jan. 19, 1993

[54] LEARNING APPARATUS

[75] Inventor: Tamihei Hiramatsu, Kanagawa, Japan

[73] Assignee: Sony Corporation, Tokyo, Japan

[21] Appl. No.: 564,872

[22] Filed: Aug. 9, 1990

[30] Foreign Application Priority Data

Aug. 22, 1989 [JP] Japan ................... 1-215355

[51] Int. Cl.$^5$ .................. G09B 19/06; G09B 19/08
[52] U.S. Cl. .................... 434/157; 434/185; 434/319; 364/419
[58] Field of Search ............ 434/157, 185, 319; 364/419; 273/237, 460

[56] References Cited

U.S. PATENT DOCUMENTS

| 4,658,374 | 4/1987 | Tanimoto et al. | 434/157 X |
| 4,706,212 | 11/1987 | Toma | 434/157 |
| 4,710,130 | 12/1987 | Aarons | 434/157 |
| 4,710,877 | 12/1987 | Ahmed | 434/157 |
| 4,712,189 | 12/1987 | Mohri | 434/157 |
| 4,786,255 | 11/1988 | Hiramatsu | 434/157 |
| 5,065,317 | 11/1991 | Hiramatsu et al. | 434/157 |

FOREIGN PATENT DOCUMENTS 0766434 1/1957 United Kingdom ............ 434/157

OTHER PUBLICATIONS

"Maintenance in Teaching Labs" by Russ Parlat, Electronic World, May 1962, pp. 46-48 and 50.

Primary Examiner—Richard J. Apley
Assistant Examiner—Joe H. Cheng
Attorney, Agent, or Firm—Limbach & Limbach

[57] ABSTRACT

A learning apparatus in which a memory contains a first plurality of data units and a second plurality of data units each of which is related to a unit of the first program. Switches are provided for switching between the first and second pluralities of data units and for switching between the units within the selected plurality. Reading means are provided for reading a designated unit of data from the memory, based on a signal from the operation switch, thus making it possible to access and reproduce any desired program or articles related to the program. In another embodiment, a control memory holds the addresses of the data units, and the reading means obtains the address of the selected data unit from the control memory and reads the data at that address. The apparatus is uniquely suited for audio teaching material, such as languages, but may be used with any information which may be organized into logically related units.

2 Claims, 4 Drawing Sheets

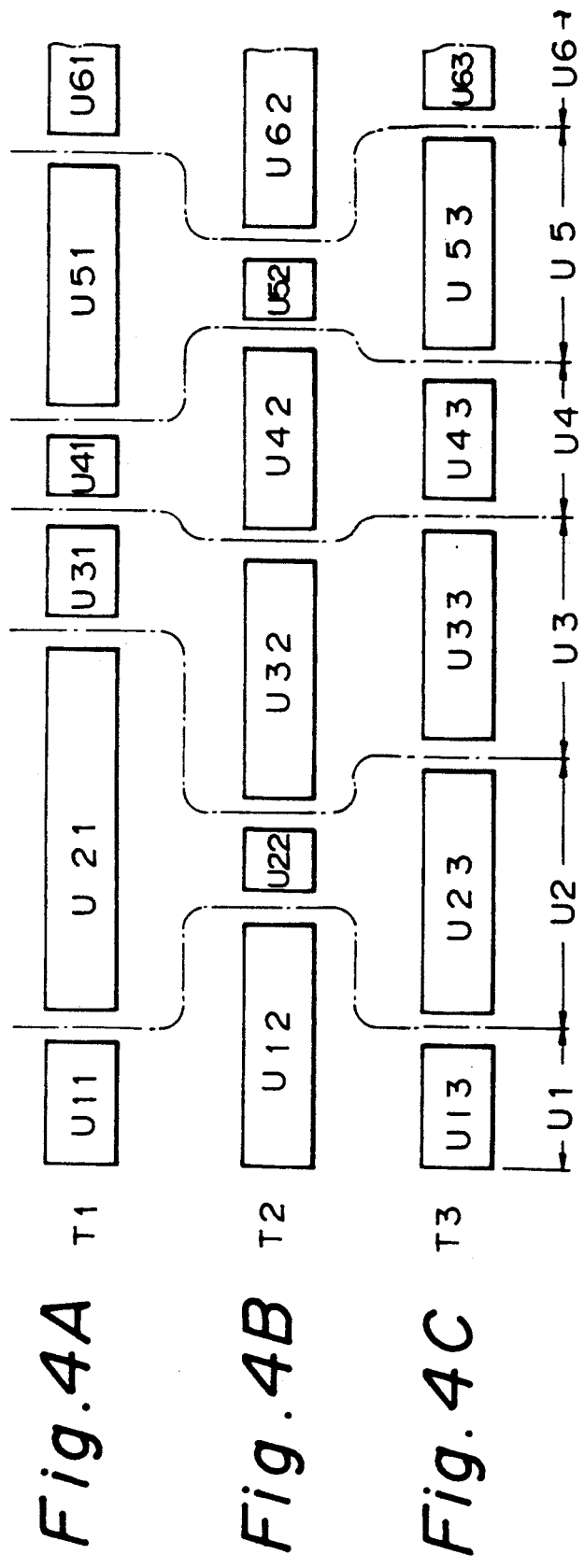

LEARNING APPARATUS

BACKGROUND OF THE INVENTION

1. Field of the Invention

This invention relates to a learning apparatus and, more particularly, to a learning apparatus using audio teaching material.

2. Description of the Prior Art

In a conventional LL (language laboratory) system, audio material is used as teaching material, and a tape recorder is used to record and playback the audio teaching material.

Such audio teaching material is recorded on a tape in a one-dimensional sequential form, for example, as shown in FIG. 1A, and a desired portion thereof is reproduced in response to an operation of the tape recorder such as forward, reverse or other operation. In FIGS. 1A, UA, UB, UC, UD and UE denote units of the audio teaching material recorded on the tape, and these units UA, UB, UC, UD and UE form a linear teaching element T.

However, the use of a tape recorder for recording and reproducing audio teaching material involves the following problems, the solution of which has been desired.

(1) It is difficult to access notes and articles related to a certain reproduced portion where the related material is recorded at a distant position. For example, as shown in FIG. 1C, when a user wants to access a related article UA0 of the unit UA of the audio teaching material which is recorded elsewhere, access thereto takes time and may be troublesome.

(2) On the other hand, where the notes and related articles are immediately adjacent to the appropriate teaching material, access to other units of audio teaching material is time consuming and troublesome. For example, as shown in FIG. 1B, when a user wants to access to the unit UB just after the unit UA of the audio teaching material, the related article UA0, which is recorded subsequently to the unit UA, disturbs the desired access, causing the user to expend time and effort to locate the next unit UB.

(3) It is difficult to add notes and related articles to the teaching material.

(4) In the case of language study, it is difficult to compare and make reference among a plurality of languages relating to the same substance.

The use of a memory as storing means is shown, for example, by Japanese Patent Laid-Open Publication No. Sho 59-889 and Japanese Patent Laid-Open Publication No. Sho 59-224897, which disclose proposals of the present Applicant. However, these known systems do not teach positioning a certain reproduced item of audio teaching material and notes or articles related thereto in a related manner so as to enable easy and quick access to each of them as described above, and an improvement has been desired for the use of a tape recorder.

SUMMARY OF THE INVENTION

It is, therefore, an object of the present invention to provide a learning apparatus enabling easy access to a program and notes or articles related to the program.

According to an aspect of the invention, there is provided a learning apparatus comprising: an audio memory storing a first program consisting of a plurality of units and a second program related to each unit of the first program; operation switches for switching the first and second programs and for switching the units; and control means for reading out a designated one of the units of audio data from the audio memory, based on a signal from the operation switch.

According to another aspect of the invention, there is provided a learning apparatus comprising: an audio memory storing a first program consisting of a plurality of units and a second program related to each unit of the first program; operation switches for switching the first and second programs and for switching the units; and control means for reading out a designated one of the units of audio data from the audio memory via a control memory which holds start addresses and/or end addresses, based on a signal from the operation switch.

The features and advantages described in the specification are not all inclusive, and particularly, many additional features and advantages will be apparent to one of ordinary skill in the art in view of the drawings, specification and claims hereof. Moreover, it should be noted that the language used in the specification has been principally selected for readability and instructional purposes, and may not have been selected to delineate or circumscribe the inventive subject matter, resort to the claims being necessary to determine such inventive subject matter.

BRIEF DESCRIPTION OF THE DRAWINGS

FIGS. 4A and 4C are views of one possible arrangement of the respective elements of teaching material according the the present invention.

DETAILED DESCRIPTION OF THE PREFERRED EMBODIMENTS

FIGS. 1A through 4C of the drawings depict various preferred embodiments of the present invention for purposes of illustration only. One skilled in the art will readily recognize from the following discussion that alternative embodiments of the structures and methods illustrated herein may be employed without departing from the principles of the invention described herein.

An embodiment of the invention is described below, referring to FIGS. 2 to 4.

FIGS. 4A to 4C show an arrangement of audio teaching material, notes and articles related to the audio teaching material according to the present invention.

The audio teaching material shown in FIG. 4A consists of a plurality of, for example, Japanese sentences, the material shown in FIG. 4B consists of, for example, English sentences corresponding to the respective Japanese sentences, and the material shown in FIG. 4C consists of English words or alternative expressions which form articles related to the respective English sentences.

In the audio teaching material shown in FIG. 4A, respective Japanese sentences are indicated as units U11 through U61, and these units U11 to U61 are disposed sequentially in time to form a line teaching element T1. In the same way, the individual English sentences are indicated by units U12 through U62 in FIG. 4B, and these units U12 to U62 are disposed sequentially in time to form a line teaching element T2. Finally, in FIG. 4C, individual articles related to the respective English sentences are indicated by units U13 through U63, and these units U13 to U63 are disposed sequentially in time to form a line teaching element T3. Any given unit can be designated by a mark UXY, where X indicates the number on a line of the unit U, and Y indicates the number of the line teaching element T.

Since the audio teaching material is arranged two-dimensionally by a plurality of line teaching elements T1 to T3 as explained above, it is desirable to allow the user access to a desired line teaching element T or to enable comparison and reference among the corresponding units of the different line teaching elements T1 to T3.

Figure 1:
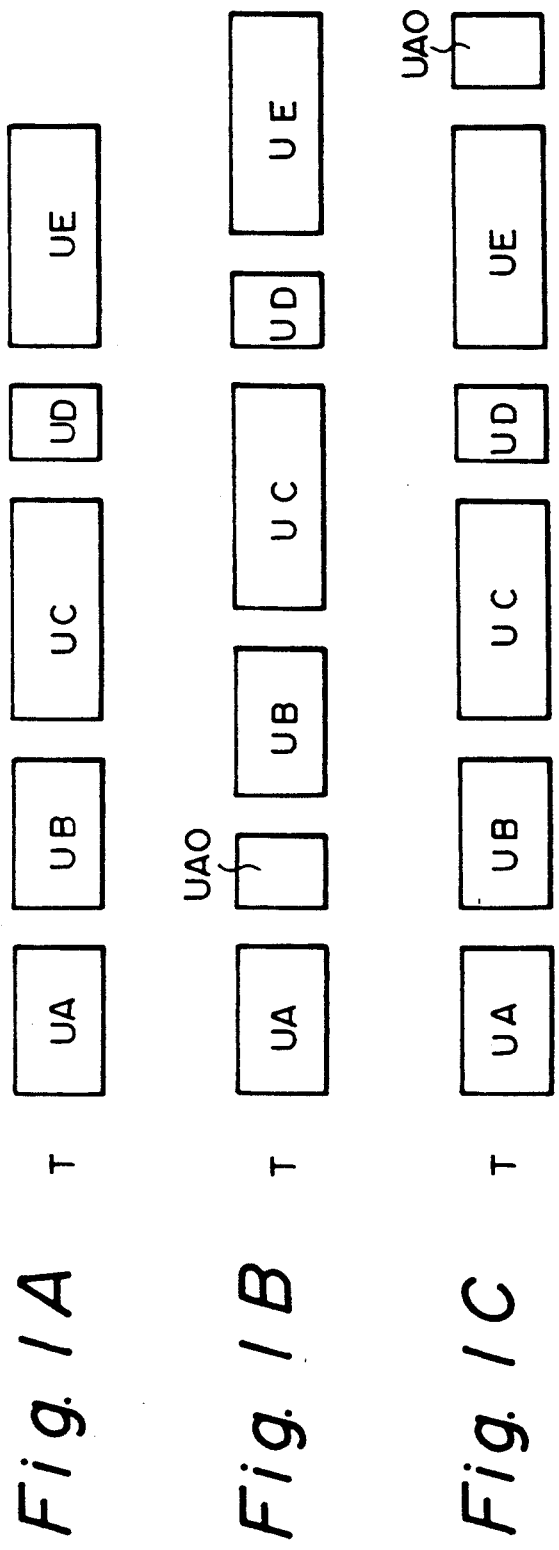
FIGS. 1A to 1C shows various conventional arrangements of respective elements of teaching material.
Figure 2:
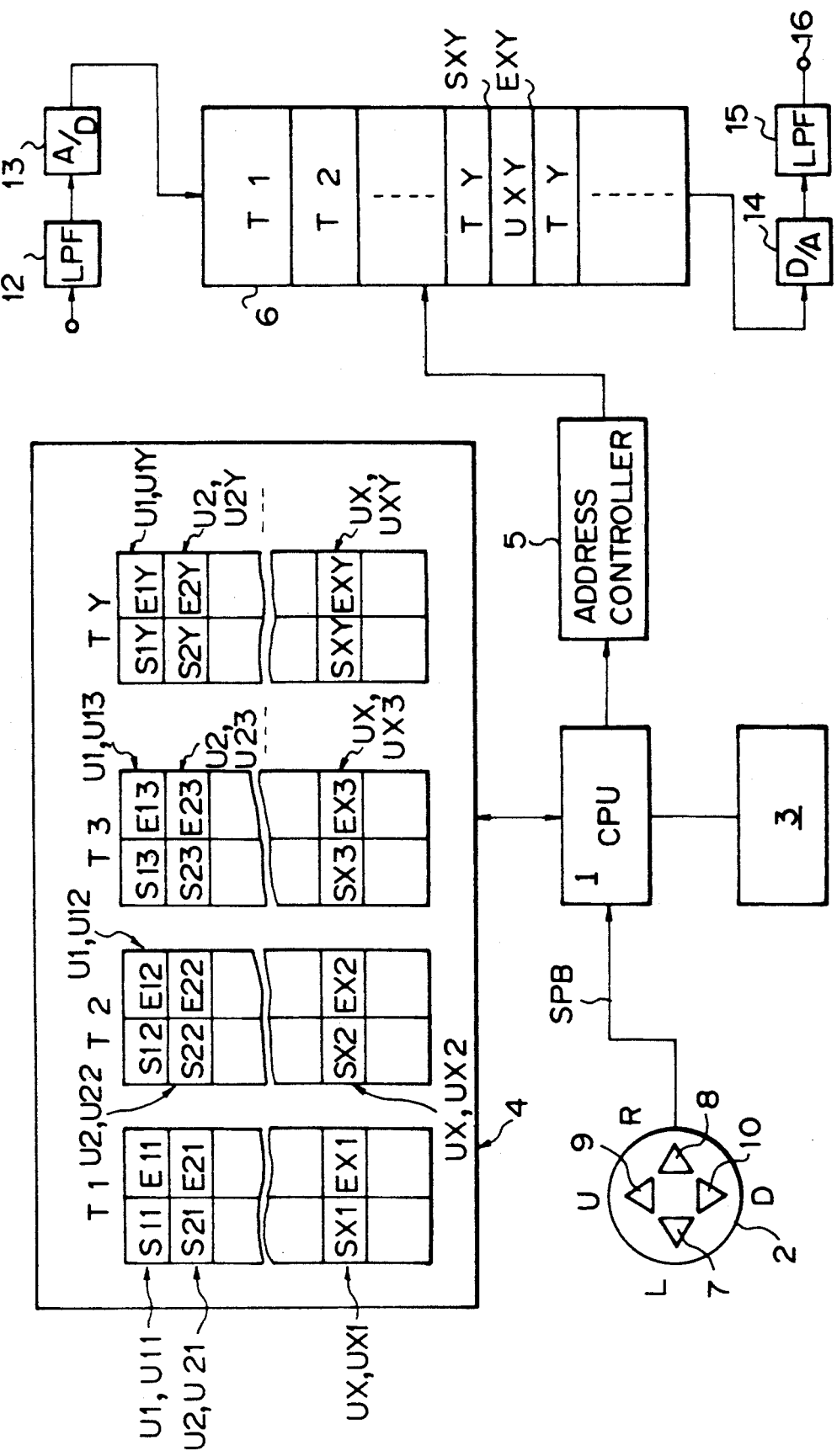
FIG. 2 is a block diagram showing one embodiment of the present invention.

In the arrangement of FIG. 2, a playback access switch (hereinafter called an access switch) 2 and an audio storage control switch section 3 provided with various switches for controls during audio storage are connected to a CPU 1.

The CPU 1 controls the operation of the entire system, based on a signal supplied from the audio storage control switch section 3 during recording of audio teaching material. That is, under control by the CPU 1, an audio signal supplied from a terminal 11 through a low pass filter 12 is converted into a digital signal by an A/D converter 13, and stored in an audio memory 6.

During playback of the audio teaching material, the CPU 1 reads a start address S and an end address E of a desired unit U in a desired line teaching element T from a control memory 4, based on the signal SPB supplied from the access switch 2, and supplies it to the audio memory 6 through an address controller 5. Data is read from the audio memory 6 based on the address read from the control memory 4 and, after it is converted into an analog audio signal by a D/A converter 14, the analog audio signal is taken out via a low pass filter 15 and terminal 16.

The access switch 2 includes four cursors 7 to 10 and is used by the user to select a desired line teaching element T and a desired unit U by referring to arrangements of the line teaching elements T and units U indicated in the form of, for example, a map.

When cursors 7 and 8 are operated, corresponding signals SPB are supplied to the CPU 1 and, under control by the CPU 1, units in the same line teaching element T, e.g. U11, U21, U31, . . . UX1, etc., are reproduced in the order of their numbers.

Similarly, when cursors 9 and 10 are operated, corresponding signals SPB are supplied to the CPU 1 and, under control by the CPU 1, units having the same column number in different teaching elements T, e.g. U11, U12, U13, . . . U1Y, etc., are reproduced sequentially. The cursors 7 to 10 may be designed so that each depression thereof causes movement of one unit or a plurality of units U.

The audio memory 6 stores the audio teaching material in order of numbers of the line teaching elements T. The audio teaching material consists of, as shown in FIG. 4, the line teaching element T1 made of units U11, U21, U31, . . . UX1, etc., of Japanese sentences, the line teaching element T2 made of units U12, U22, U32, . . . UX2, etc., of English sentences corresponding to the Japanese sentences and the line teaching element T3 made of units U13, U23, U33, . . . UX3, etc., of English words or alternative expressions which are articles related to the respective English sentences. Other line teaching elements up to TY may be further stored, if necessary, as illustrated in FIG. 2.

The start address S and the end address E of each unit U forming the line teaching element T are stored in the control memory 4 for each line teaching element T. When the audio teaching material is reproduced in each sentence unit from the audio memory 6 storing the audio teaching material, the address at the start point of the sentence which is detected and acknowledged thereupon is determined as the start address S, and the address at the end point of the sentence is determined as the end address E. A cur signal may be inserted in each position where the unit U terminates, to create a pause time. Further, an address for the aforementioned pause time may be recorded in the control memory 4 in addition to the start address S and the end address E.

As to preparation and division of the line teaching elements T, setting of start addresses S and end addresses E of line teaching elements T and units U, writing of the start addresses S and the end addresses E into the control memory 4 and writing of the audio teaching material into the audio memory 6, a technology disclosed in Japanese Patent Laid-Open Publication No. Sho 63-24278 of the instant Applicant's proposal may be used.

Figure 3:
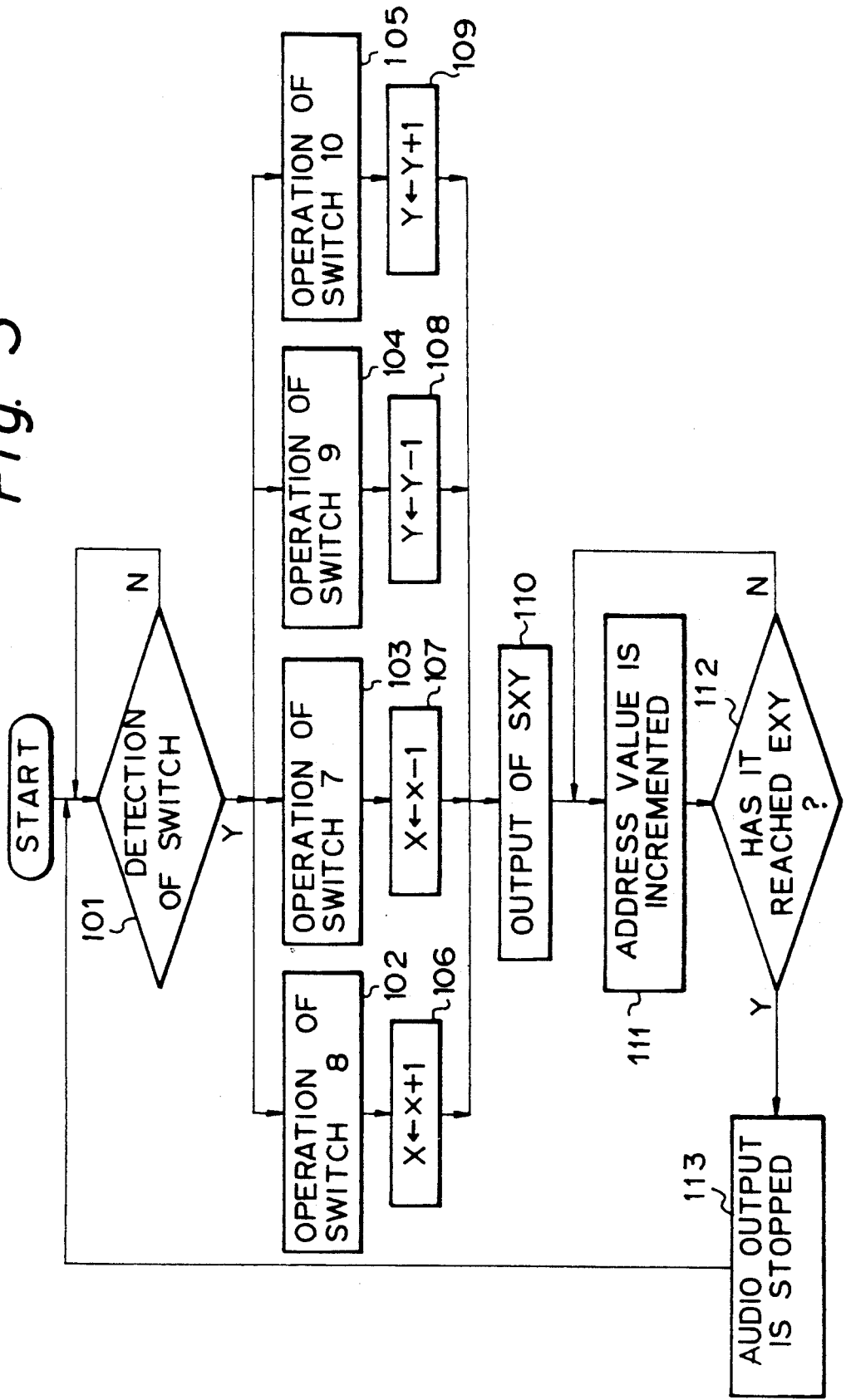
FIG. 3 is a flow chart showing the operation of one embodiment of the present invention.

The flow chart of FIG. 3 shows the method of operation of the present invention.

In step 101, it is determined whether the access switch 2 has not been operated or not. When the access switch 2 has not been operated, the system is held in a stand-by condition. When operation of the access switch 2 is detected, it is judged which of the four cursors 7 to 10 has been operated. When the switch 8 has been operated, the flow proceeds to a step 102. When the switch 7 has been operated, it proceeds to a step 103. When the switch 9 has been operated, it proceeds to a step 104. When the switch 10 has been operated, it proceeds to a step 105.

The step 102 is chosen when the switch 8 is operated and, in this case, the number X of the unit U in a certain line teaching element TY is incremented in a subsequent step 106. After this, the flow proceeds to a step 110.

The step 103 is chosen when the switch 7 is operated and, in this case, the number X of the unit U in a certain line teaching element TY is decreased in a subsequent step 107 After this, it proceeds to the step 110.

The step 104 is chosen when the switch 9 is operated. Operation of the switch 9 indicates that the units U having the same number X and belonging to different line teaching elements T having different numbers are reproduced and, in a subsequent step 108, the number Y of the line teaching element T is decreased. After this, the flow proceeds to a step 110.

The step 105 is chosen when the switch 10 is operated. Operation of the switch 10 indicates that the unit U having the same number X and belonging to different line teaching elements T having different numbers are reproduced and, in a subsequent step 109, the number Y of the line teaching element T is incremented. After this, the flow proceeds to the step 110.

In the step 110, playback of the audio teaching material is carried out by reading out a start address S, e.g., SXY, from the control memory 4 and supplying it to the audio memory 6 via the address controller 5, based on the number Y of the line teaching element T and the number X of the unit U obtained in the foregoing steps 106 to 109 under control by the CPU 1. After this, the flow proceeds to a step 111.

In the step 111, the aforementioned start address SCY is incremented and data in a new address is reproduced. After this, it proceeds to a step 112.

In the step 112, it is judged whether the address of the audio teaching material now reproduced has reached the end address E, e.g. EXY, or not. If it has not been reached, the flow returns back to the step 111 and, if it has been reached, it proceeds to a step 113.

In the step 113, playback of the audio teaching material is stopped. After this, the flow returns back to the step 101.

In this manner, a user can readily and easily access a plurality of line teaching elements T or a plurality of related units U in a plurality of line teaching elements T.

From the above description, it will be apparent that the invention disclosed herein provides a novel and advantageous apparatus for using audio teaching material. The foregoing discussion discloses and describes merely exemplary methods and embodiments of the present invention. As will be understood by those familiar with the art, the invention may be embodied in other specific forms without departing from the spirit or essential characteristics thereof.

For example, this embodiment has been explained using an example in which, as a language study, Japanese and English sentences and related articles are stored in the audio memory 6. However, the teaching material is not limited to this. Various other languages may obviously also be used as the teaching material.

Other examples of material suitable for use in a system of the present invention include items which can be stored in the form of questions and answers, words and their antonyms, words and phrases, changes in tense (present tense and past tense), changes in voice (active voice and passive voice), alternative expressions, etc. Any such combinations may be employed as the audio teaching material. Further, any subject of study, not limited to languages may be chosen, as long as the material may be logically paired in some fashion.

Accordingly, the disclosure of the present invention is intended to be illustrative, but not limiting, of the scope of the invention, which is set forth in the following claims.

What is claimed is:

1. An apparatus comprising:

a memory containing a first plurality of data units, wherein each of the data units in the first plurality of data units is first language audio teaching material, and a second plurality of data units, wherein each of the data units in the second plurality of data units is second language audio teaching material, and wherein each of the data units in the second plurality of data units corresponds logically to a unit of said first plurality of data units;

switching means for selecting among units in said first and second pluralities of data units, wherein the switching means comprises a first set of cursor operation switches for switching between logically corresponding data units in said first and second pluralities of data units, and a second set of cursor operation switches for switching between data units within said first plurality of data units or within said second plurality of data units; and reading means for reading each selected unit of data from said memory.

2. A learning apparatus comprising:

a memory containing a first plurality of data units, wherein each of the data units in said first plurality of data units is first language audio teaching material, and a second plurality of data units, wherein each of the data units in said second plurality of data units is second language audio teaching material, and wherein each of the data units in said second plurality of data units corresponds logically to a unit of said first plurality of data units;

a control memory which holds addresses of data units in said first and second pluralities of data units;

switching means for selecting among data units in said first and second pluralities of data units, wherein said switching means comprises a first set of cursor operation switches for switching between logically corresponding data units in said first and second pluralities of data units, and a second set of cursor operation switches for switching between data units within said first plurality of data units or within said second plurality of data units; and reading means for reading an address of a data unit selected by the switching means from the control memory and reading a unit of data which is located at said address in said memory.

* * * * *